United States Patent
Häusler et al.

(10) Patent No.: US 12,333,502 B2
(45) Date of Patent: Jun. 17, 2025

(54) MAINTENANCE PLANNING SYSTEM, METHOD AND COMPUTER PROGRAM FOR DETERMINING MAINTENANCE MEASURES FOR A PRODUCTION PLANT, IN PARTICULAR A PRODUCTION PLANT OF THE METAL PRODUCTION INDUSTRY, THE NON-FERROUS OR STEEL INDUSTRY OR MASTER ALLOY MANUFACTURE

(71) Applicant: SMS group GmbH, Düsseldorf (DE)

(72) Inventors: Christoph Häusler, Duisburg (DE); Sebastian Schulz, Aachen (DE); Claus Wilk, Hilchenbach (DE); Christian Mohr, Kerpen (DE)

(73) Assignee: SMS group GmbH, Düsseldorf (DE)

( * ) Notice: Subject to any disclaimer, the term of this patent is extended or adjusted under 35 U.S.C. 154(b) by 441 days.

(21) Appl. No.: 17/927,670

(22) PCT Filed: May 6, 2021

(86) PCT No.: PCT/EP2021/061969
§ 371 (c)(1),
(2) Date: Nov. 23, 2022

(87) PCT Pub. No.: WO2021/239429
PCT Pub. Date: Dec. 2, 2021

(65) Prior Publication Data
US 2023/0214787 A1    Jul. 6, 2023

(30) Foreign Application Priority Data
May 25, 2020 (DE) .................... 10 2020 206 477.6

(51) Int. Cl.
G06Q 30/00    (2023.01)
G05B 23/02    (2006.01)
(Continued)

(52) U.S. Cl.
CPC ......... *G06Q 10/20* (2013.01); *G05B 23/0283* (2013.01); *G06Q 50/04* (2013.01)

(58) Field of Classification Search
CPC .... G06Q 10/20; G06Q 50/04; G05B 23/0283; G05B 19/4188; G05B 2219/32015; G05B 2219/32234; Y02P 90/02; Y02P 90/80
See application file for complete search history.

(56) References Cited

U.S. PATENT DOCUMENTS 7,720,727 B2 * 5/2010 Keyes ................ G06Q 30/0283
705/30
7,840,287 B2 * 11/2010 Wojsznis ............... G05B 17/02
703/2

(Continued)

FOREIGN PATENT DOCUMENTS

DE    102004036300 A1    3/2005
EP        3358431 A1    8/2018
(Continued)

OTHER PUBLICATIONS

Bao, Jinsong, et al. "The Modelling and Operations for the Digital Twin in the Context of Manufacturing." Enterprise Information Systems, Oct. 1, 2018. (Year: 2018).*

(Continued)

*Primary Examiner* — Luis A Brown
(74) *Attorney, Agent, or Firm* — Smartpat PLC

(57) ABSTRACT

A maintenance planning system for a production plant comprises: a production planning system for determining a production sequence for the production plant; an automation system for controlling production in the production plant; a state monitoring system for acquiring states of the production plant and its components; and a business planning system for the economic management of production and maintenance in the production plant. The maintenance planning system is designed for determining maintenance mea- (Continued)

sures for the production plant. When determining the maintenance measures, the maintenance planning system takes into account the information of the production planning system, the automation system, the state monitoring system and the business planning system and performs optimization with regard to an economic utilization of the production plant. The disclosure further relates to a method for determining maintenance measures for a production plant and corresponding computer programs.

14 Claims, 2 Drawing Sheets

(51) Int. Cl.
  G06Q 10/20 (2023.01)
  G06Q 50/04 (2012.01)

(56) References Cited

U.S. PATENT DOCUMENTS

| | | | | |
|---|---|---|---|---|
| 2004/0204775 | A1* | 10/2004 | Keyes | G06Q 10/063 705/400 |
| 2010/0257464 | A1* | 10/2010 | Renner | G06Q 50/02 715/753 |
| 2010/0286798 | A1* | 11/2010 | Keyes | G06Q 40/12 700/36 |
| 2011/0313734 | A1* | 12/2011 | Grosch | G06F 3/0325 703/1 |
| 2014/0343911 | A1* | 11/2014 | Dallmann | G05B 19/41885 703/6 |
| 2016/0018835 | A1* | 1/2016 | Gaasch | G05F 1/66 700/291 |
| 2016/0147202 | A1* | 5/2016 | Nandigam | G05B 19/41865 703/2 |
| 2017/0185943 | A1* | 6/2017 | Wang | G06Q 10/0631 |
| 2018/0130260 | A1* | 5/2018 | Schmirler | G06F 3/011 |
| 2018/0131907 | A1* | 5/2018 | Schmirler | G05B 23/0216 |
| 2018/0239342 | A1* | 8/2018 | Jeon | G06F 30/20 |
| 2018/0239840 | A1* | 8/2018 | Santarone | G06T 19/00 |
| 2019/0026537 | A1* | 1/2019 | Arisoy | G06N 20/00 |
| 2019/0121334 | A1* | 4/2019 | Song | G06N 20/00 |
| 2019/0147655 | A1* | 5/2019 | Galera | G06T 15/20 345/419 |
| 2019/0244309 | A1* | 8/2019 | Ottnad | G06Q 50/04 |
| 2019/0340909 | A1* | 11/2019 | Nguyen | B25J 9/1676 |
| 2020/0004230 | A1* | 1/2020 | Ankermann | G07C 3/146 |
| 2020/0089827 | A1* | 3/2020 | Dittel | G06F 17/11 |
| 2020/0160258 | A1* | 5/2020 | Ameri | G06Q 10/087 |
| 2021/0048801 | A1* | 2/2021 | Windmeier | G05B 17/02 |
| 2021/0372116 | A1* | 12/2021 | Hillenburg | F25J 3/0489 |
| 2023/0214787 | A1* | 7/2023 | Häusler | G06Q 50/04 |

FOREIGN PATENT DOCUMENTS

| | | | |
|---|---|---|---|
| EP | 3547048 A1 | 10/2019 | |
| WO | 2012025438 A1 | 3/2012 | |
| WO | WO-2017013108 A1 * | 1/2017 | G06Q 10/063 |
| WO | 2018073422 A2 | 4/2018 | |
| WO | 2019163979 A1 | 8/2019 | |

OTHER PUBLICATIONS

Cimino, Chiara. "Review of Digital Twin Applications in Manufacturing." Computers in Industry, vol. 113, Oct. 2019. (Year: 2019).*
Vachalek, Jan, et al. "The Digital Twin of an Industrial Production Line Within the Industry 4.0 Concept." IEEE, 2017 International Conference on Process Control, Strbske Pleso, Solvakia, Jun. 6-9, 2017. (Year: 2017).*
Bevilacqua, Maurizio, et al. "Digital Twin Reference Model Development to Prevent Operators' Risk in Process Plants." Sustainability, vol. 12, No. 1088, Feb. 2020. (Year: 2020).*
Aivaliotis, P. "The Use of Digital Twin for Predictive Maintenance in Manufacturing." International Journal of Computer Integrated Manufacturing, vol. 32, No. 11, pp. 1067-1080, Nov. 2019. (Year: 2019).*
Terkaj, Walter, et al. "A Virtual Factory Approach for In Situ Simulation to Support Production and Maintenance Planning." CIRP Annuals—Manufacturing Technology, vol. 64, pp. 451-454, 2015. (Year: 2015).*
Brumby, Lennart. "Normen und Standards als Grundlage einer modernen Instandhaltung." Betriebliche Instandhaltung (2018): 385-394.
Mühlnickel, Helmut, Cäcilia Maria Kurz, Philipp Jussen, and Roman Emonts-Holley. "Smart Maintenance: Instandhaltung im Kontext der Industrie 4.0." Betriebliche Instandhaltung (2018): 349-360.
Schnell, Marcus, Philipp Jussen, and Benedikt Moser. "Smart Services—Datenbasierte Dienstleistungen in der Instandhaltung." Betriebliche Instandhaltung (2018): 361-373.
Zapp, Thomas, Philipp Jussen, and Michael Kurz. "Informations- und Kommunikationstechnologien für die Instandhaltungsplanung und-steuerung." Betriebliche Instandhaltung (2018): 205-222.

* cited by examiner

MAINTENANCE PLANNING SYSTEM, METHOD AND COMPUTER PROGRAM FOR DETERMINING MAINTENANCE MEASURES FOR A PRODUCTION PLANT, IN PARTICULAR A PRODUCTION PLANT OF THE METAL PRODUCTION INDUSTRY, THE NON-FERROUS OR STEEL INDUSTRY OR MASTER ALLOY MANUFACTURE

TECHNICAL FIELD

The disclosure relates to a maintenance planning system for a production plant, in particular a production plant of the metal production industry, the non-ferrous or steel industry or master alloy manufacture. The disclosure further relates to a method and computer program for determining maintenance measures for a production plant, in particular a production plant of the metal production industry, the non-ferrous or steel industry or master alloy manufacture.

BACKGROUND

Production plants in the metal production industry, the non-ferrous or steel industry or master alloy manufacture are used, for example, for the production of slabs, sheets, tubes, beams, rails, other profiles or strips of metal and forged products along with their preliminary products or for carrying out individual work steps within the scope of production. Thereby, the production plant must guarantee a certain product quality and have the highest possible productivity. On the other hand, the machines used in production plants are subject to wear and tear and other failure mechanisms.

Production in the production plant is planned with sufficient lead time, with the aim of optimizing the productivity of the production plant. For this purpose, for example, the timing of shutdowns for maintenance work is planned in such a manner that the productivity of the production plant is affected as little as possible.

WO 2012/025 438 A1 discloses a method for operating a rolling mill that is controlled by an automation system. The rolling mill works through a predefined production sequence. The state of the rolling mill is monitored by a state monitoring system. On the basis of state monitoring and production planning data, expected future states of the rolling mill, in particular wear states of rolling mill components, are identified. If a predefined value is exceeded, a warning message is output.

EP 3 358 431 A1 concerns the planning of production and/or maintenance plans for a basic industry plant. A production planning system for the basic industry plant identifies its production planning data and provides it to the automation system of the plant. A state monitoring system identifies past and future expected states of components of the plant. A quality determination system identifies states of output products produced and to be produced in the plant and/or past and future states of the plant as a whole. A maintenance planning system and/or the production planning system receive from the state monitoring system the states of the components of the plant identified by the latter, and from the quality determination system the states of the output products and/or the plant as a whole identified by the latter. They take into account the data received from the state monitoring system and the quality determination system when identifying maintenance planning data and/or the production planning data.

The systems and methods known from the prior art for planning maintenance work in a production plant are based on the evaluation of the technical state of the production plant, taking into account the data from the production planning system with regard to the products to be produced in the future.

SUMMARY

The technically most viable point in time for maintenance of the production plant does not necessarily result in optimum economic operation of the production plant. As a result, production plants are operated in an economically suboptimal manner and operators cannot even provide information on what economic performance would be achievable.

The present disclosure provides a maintenance planning system and a method and computer program for determining maintenance measures for a production plant, which optimize the maintenance work in the production plant with regard to an economic use of the production plant.

The is achieved by a maintenance planning system for a production plant, in particular a production plant of the metal production industry, the non-ferrous or steel industry or master alloy manufacture, wherein the production plant comprises:
  a production planning system for determining a production sequence for the production plant, in particular control data for an automation system,
  the automation system for controlling production in the production plant, wherein the automation system preferably executes the production sequence determined by the production planning system,
  a state monitoring system for acquiring states of the production plant and its components, and
  a business planning system for the economic management of production and maintenance in the production plant.

The maintenance planning system is designed for determining maintenance measures for the production plant, in particular comprising a listing of the maintenance measures to be carried out, a listing of the items required for the maintenance measures to be carried out, a listing of the persons and/or equipment involved in the maintenance measures, a schedule for the maintenance measures to be carried out, a listing and/or execution of orders for operating resources and spare parts, and the like.

When determining the maintenance measures, the maintenance planning system takes into account the information of the production planning system, the automation system, the state monitoring system and the business planning system and optimizes the maintenance measures with regard to an economic utilization of the production plant.

The disclosure is based on the finding that the technical optimization of maintenance measures known from the prior art is not synonymous with the economic operation of the production plant. Even if it appears viable from a technical point of view to carry out a maintenance measure, this is not necessarily economically optimal. It is possible that continued operation of the production plant without maintenance is more favorable economically. With economic optimization, it can be taken into account, for example, that maintenance measures can be combined at a later point in time in order to reduce downtime or the costs of shutting down and restarting the production plant. For this purpose, the maintenance planning system takes into account the data from the business planning system and links such data with the data from the production planning system, the automation system and the state monitoring system. The data from the aforementioned systems are linked with each other and economically optimized.

For example, the optimization of the maintenance measures can reduce the costs for stock-keeping, since the required spare parts can be ordered on a timely basis (just in time) to match the optimized maintenance measures. This reduces tied-up capital and allows procurement processes to be optimized where necessary.

By means of the present disclosure, the overall economic balance of the production plant, in particular in the field of repair, is dynamically optimized to the current and near future load situation.

According to a variant, the state monitoring system provides a prediction of states of the production plant and its components. The maintenance planning system takes this prediction into account when determining the maintenance measures. In particular, this enables critical states that are likely to arise to be identified and avoided through corresponding maintenance measures. This applies in particular to future critical states of the production plant due to technical reasons, which can be prevented by carrying out maintenance measures.

In one variant, the production sequence determined by the production planning system comprises information about which input products are fed to the production plant and which output products are produced from the input products, in particular in which chronological order. Since the business planning system comprises, for example, data on the availability of incoming products, inventories, delivery times, procurement costs and the like, linking and optimizing such data can improve the economic use of the production plant.

In accordance with an advantageous variant, the production plant further comprises a quality determination system for acquiring product qualities of the products produced in the production plant. The maintenance planning system preferably takes into account the information from the quality determination system when determining the maintenance measures. Through the quality determination system, the actual product qualities achieved are acquired and there can be a check of whether these correspond to the orders from the production planning system. If the actual product qualities deviate from the intended product qualities, this can have an impact on the carrying out of maintenance measures. For example, if higher actual product qualities are achieved, maintenance measures can be postponed, and if lower actual product qualities are achieved, maintenance measures may need to be pulled ahead. Alternatively, the production sequence can also be adjusted, such that products to be produced with high quality requirements, for example, are pulled ahead or postponed to a point in time after maintenance.

According to a variant of the maintenance system, the quality determination system provides a prediction of product qualities of the products produced in the production plant. Such prediction is taken into account by the maintenance planning system when determining the maintenance measures. By predicting the product qualities, the operation of the production plant can be further economically optimized.

In an expedient variant, the maintenance planning system takes into account the costs for a maintenance measure and the yields achieved by the maintenance measure when optimizing the economic utilization of the production plant. Such an economic consideration of the maintenance measures is not known from the prior art.

In accordance with an expedient variant, the business planning system provides economic information on: Material purchasing, resource purchasing, spare parts procurement, spare parts management, delivery costs, delivery times, storage costs, personnel costs, or the like.

In an advantageous variant, the maintenance planning system takes into account the intensity of the maintenance work, the influence of the maintenance work on product quality and/or process control, the personnel expenditure, or the like, when optimizing the economic utilization of the production plant.

According to a particularly preferred variant, the maintenance planning system continuously optimizes the maintenance measures over the runtime of the production plant. The maintenance measures are therefore constantly optimized, such that unforeseen changes to or in the production plant or states related to production are also taken into account and the maintenance measures are adjusted accordingly in order to ensure the optimum economic operation of the production plant. In addition, the loads on the production plants, their age, the spare parts used and repairs carried out change over the years. A repair strategy adjusted upon the commencement of the plant's life is usually not tracked in the prior art, in exceptional cases only manually. Thus, the necessary measures and the specifications may drift apart significantly over time. Continuous optimization in accordance with the present disclosure avoids this problem.

In accordance with an advantageous variant, the maintenance planning system creates a digital model of the production plant. By means of the digital model, the maintenance planning system optimizes the maintenance measures with regard to an economic utilization of the production plant, in particular taking into account the information of the production planning system, the automation system, the state monitoring system and the business planning system. In particular, the model created thereby maps the relationships between the data from the business planning system and the data from the production planning system, the automation system and the state monitoring system. On the basis of the mapped relationships, the model created is optimized with regard to the economic use of the production plant. Thereby, the digital model is designed as a digital twin of the production plant and comprises in particular the information of the production planning system, the automation system, the state monitoring system and the business planning system.

In a particularly preferred variant, the maintenance planning system continuously trains the digital model created, in particular taking into account information from the production planning system, the automation system, the state monitoring system and the business planning system. Thus, the digital model created is continuously improved, which improves the economic utilization of the plant.

According to an expedient variant, the digital model is based on artificial intelligence methods, in particular machine learning or neural networks, decision trees, linear or nonlinear regression models, support vector machines and/or big data analysis.

In accordance with a variant, the maintenance planning system transmits the maintenance measures determined at least partially to the other systems of the production plant, in particular to the production planning system, the automation system, the state monitoring system, the business planning system and/or the quality determination system, prior to the carrying out of the maintenance measures. The other systems of the production plant may thus adjust to the planned maintenance measures and take them into account in their own planning.

In one variant, the maintenance planning system creates an initial maintenance plan with maintenance measures or an initial maintenance plan with maintenance measures is provided to the maintenance planning system. For example, the initial maintenance plan is based on historical data from the production plant and/or data from comparable production plants. The initial maintenance plan can also be based on expert knowledge. The initial maintenance plan is based in particular on one of the following methods: Reliability centered maintenance (RCM), failure mode effectiveness and criticality analysis (FMECA) and maintenance engineering based on the principles of reliability centered maintenance (ME-RCM).

According to an advantageous variant, the maintenance planning system has a user interface for entering data of a user, in particular of the maintenance personnel, on maintenance work carried out, observed states or defects of the production plant, or the like. Since not all states, product qualities, maintenance work carried out or the like can be acquired by means of sensors, data relating to these may be made available to the maintenance planning system via a user interface. This increases the database for economically optimizing the operation of the production plant.

In accordance with an expedient variant, the production planning system, the automation system, the state monitoring system, the business planning system and/or the quality determination system identify, monitor, determine or the like one or more of the following parameters: Temperatures, flow rates, spool positions, current consumption, product data, such as material, product identification numbers, torques, vibrations, contamination, wear condition, frequency of use, or the like.

In an advantageous variant, the maintenance planning system identifies the main cost drivers of the production plant on the basis of the maintenance measures determined. Such main cost drivers are also referred to as "bad actors" and are particularly taken into account when determining the maintenance measures.

According to a variant, the maintenance planning system creates a special repair strategy and/or special monitoring for the main cost drivers.

In addition to taking particular account of bad actors in the maintenance measures, the maintenance planning system can also help to replace them with other components by determining the bad actors, such that such main cost drivers (bad actors) are eliminated and the production plant operates more economically.

In accordance with a preferred variant, the maintenance planning system comprises an optimizer, which optimizes the maintenance measures with regard to an economic utilization of the production plant, in particular it determines the next maintenance date that is most economically viable. The optimizer is thus responsible for the evaluation of the available data and determines the optimum economic utilization of the production plant.

Expediently, the optimizer is based on methods of operation research, such as linear programs, convex optimization, or specifically mixed-integer optimization, or reinforcement learning, such as deep neural networks.

The object is further achieved by a method for determining maintenance measures for a production plant, in particular a production plant of the metal production industry, the non-ferrous or steel industry or master alloy manufacture, comprising the steps:

Determining a production sequence for the production plant, in particular control data for an automation system,
  Controlling the production in the production plant, in particular by executing the production sequence determined by an automation system,
  Acquiring states of the production plant and its components,
  Acquiring economic information on production and maintenance in the production plant,
  Determining maintenance measures for the production plant, in particular comprising a listing of the maintenance measures to be carried out, a listing of the items required for the maintenance measures to be carried out, a listing of the persons and/or equipment involved in the maintenance measures, a schedule for the maintenance measures to be carried out, a listing and/or execution of orders for operating resources and spare parts, and the like.

The production sequence determined, the control of production, the states acquired and the economic information acquired are taken into account when determining the maintenance measures and optimized with regard to an economic utilization of the production plant.

The technical optimization of maintenance measures known from the prior art is not synonymous with an economically optimized operation of the production plant. Not every maintenance measure that is technically viable also improves the economic utilization of the production plant at the same time. On the contrary, it is even possible that technically viable maintenance measures have a negative influence on the economic use of the production plant. For example, economic optimization can take into account combining maintenance measures at a later point in time in order to reduce downtime or the costs for shutting down and restarting the production plant. For this purpose, the method takes into account the economic data from a business planning system and links such data with the data from the production plant, in particular the individual systems of the production plant. The data from the aforementioned systems are linked with each other and economically optimized.

According to a variant, the method additionally comprises the step of identifying a prediction of states of the production plant and its components, which is preferably taken into account when determining the maintenance measures. In this manner, for example, any critical states that may arise can be identified and avoided by taking corresponding maintenance measures. This applies in particular to future critical states of the production plant due to technical reasons, which can be prevented by carrying out maintenance measures.

In a further variant, the production sequence determined comprises information about which input products are fed to the production plant and which output products are produced from the input products, in particular in which chronological order. The economic information on production and maintenance in the production plant comprises, for example, data on the availability of incoming products, stock levels, delivery times, procurement costs and the like. This economic information may be linked to the information on productions, such that the economic operation of the production plant can be optimized on the basis of such linkage of data.

In accordance with an advantageous variant, the method further comprises the step of identifying product qualities of the products produced in the production plant, which are preferably taken into account when determining the maintenance measures. The product qualities acquired may be compared with the requirements of customer orders, in order to ensure the usability of the produced products. If the actual product qualities deviate from the intended product qualities, this can have an impact on the carrying out of maintenance measures. For example, if higher actual product qualities are achieved, maintenance measures can be postponed, and if lower actual product qualities are achieved, maintenance measures may need to be pulled ahead. Alternatively, the production sequence can also be adjusted, such that products to be produced with high quality requirements, for example, are pulled ahead or postponed to a point in time after maintenance.

According to a further variant, the method comprises the step of identifying a prediction of product qualities of the products produced in the production plant, which is preferably taken into account when determining the maintenance measures. By predicting the product qualities, the operation of the production plant can be further economically optimized.

In an expedient variant, the costs for a maintenance measure and the yields achieved by the maintenance measure are taken into account when optimizing the economic utilization of the production plant. Such an economic consideration of the maintenance measures is not known from the prior art.

In accordance with an expedient variant, the economic information acquired comprises one or more of the following: Material purchasing, resource purchasing, spare parts procurement, spare parts management, delivery costs, delivery times, storage costs, personnel costs, or the like.

In an advantageous variant, the intensity of the maintenance work, the influence of the maintenance work on product quality and/or process control, the personnel expenditure, or the like are taken into account when optimizing the economic utilization of the production plant.

According to a particularly preferred variant, the maintenance planning system continuously optimizes the maintenance measures over the runtime of the production plant. The maintenance measures are therefore constantly optimized, such that unforeseen changes to or in the production plant or states related to production are also taken into account and the maintenance measures are adjusted accordingly in order to ensure the optimum economic operation of the production plant.

In accordance with an advantageous variant, the maintenance planning system creates a digital model of the production plant. By means of the digital model, the maintenance planning system optimizes the maintenance measures with regard to an economic utilization of the production plant, in particular taking into account the production sequence determined, the control of production, the states acquired and the economic information acquired. Thereby, in particular, the model created maps the relationships between the production sequence determined, the control of production, the states acquired and the economic information acquired. On the basis of the mapped relationships, the model created is optimized with regard to the economic use of the production plant. Thereby, the digital model is designed as a digital twin of the production plant and comprises in particular the information of the production planning system, the automation system, the state monitoring system and the business planning system.

In a particularly preferred variant, the maintenance planning system continuously trains the digital model created, in particular taking into account the production sequence determined, the control of production, the states acquired and the economic information acquired. Thus, the digital model created is continuously improved, which improves the economic utilization of the plant.

According to an expedient variant, the digital model is based on artificial intelligence methods, in particular machine learning or neural networks, decision trees, linear or nonlinear regression models, support vector machines and/or big data analysis.

In accordance with a variant, the maintenance measures determined are at least partially transmitted to the production plant, in particular to a production planning system, an automation system, a state monitoring system, a business planning system and/or a quality determination system of the production plant, prior to the carrying out of the maintenance measures. The other systems of the production plant may thus adjust to the planned maintenance measures and take them into account in their own planning.

In a variant, an initial maintenance plan with maintenance measures is generated or an initial maintenance plan with maintenance measures is provided. For example, the initial maintenance plan is based on historical data from the production plant and/or data from comparable production plants. The initial maintenance plan can also be based on expert knowledge. The initial maintenance plan is based in particular on one of the following methods: Reliability centered maintenance (RCM), failure mode effectiveness and criticality analysis (FMECA) and maintenance engineering based on the principles of reliability centered maintenance (ME-RCM).

According to an advantageous variant, the method comprises the step of a manual data input by a user, in particular by the maintenance personnel, on maintenance work carried out, observed states or defects of the production plant, or the like. Since not all states, product qualities, maintenance work carried out or the like can be acquired by means of sensors, data relating to these may be made available to the method via a user interface. This increases the database for economically optimizing the operation of the production plant.

In accordance with an expedient variant, one or more of the following parameters are identified, monitored, determined or the like when executing the method: Temperatures, flow rates, spool positions, current consumption, product data, such as material, product identification numbers, torques, vibrations, contamination, wear condition, frequency of use, or the like.

In an advantageous variant, the method identifies main cost drivers of the production plant on the basis of the maintenance measures determined. Such main cost drivers are also referred to as "bad actors" and are particularly taken into account when determining the maintenance measures.

According to a variant, the method creates a special repair strategy and/or special monitoring for the main cost drivers.

In addition to taking particular account of bad actors in the maintenance measures, the method can also help to replace them with other components by determining the bad actors, such that such main cost drivers (bad actors) are eliminated and the production plant operates more economically.

In accordance with a preferred variant, the maintenance measures are optimized by an optimizer with regard to an economic utilization of the production plant. In particular, the optimizer determines the next maintenance date that is most economically viable. The optimizer is thus responsible for the evaluation of the available data and determines the optimum economic utilization of the production plant.

More expediently, the optimizer is based on methods of operation research, such as linear programs, convex optimization, or specifically mixed-integer optimization, or reinforcement learning, such as deep neural networks.

The object is further achieved by a computer program comprising instructions that, when the program is executed by a computer, cause the computer to execute the method.

Furthermore, the object is achieved by a computer program comprising instructions that cause the production plant to carry out the method steps of the method.

BRIEF DESCRIPTION OF THE DRAWINGS

The invention is explained in more detail below with reference to exemplary embodiments shown in the figures.

DETAILED DESCRIPTION

Figure 1:
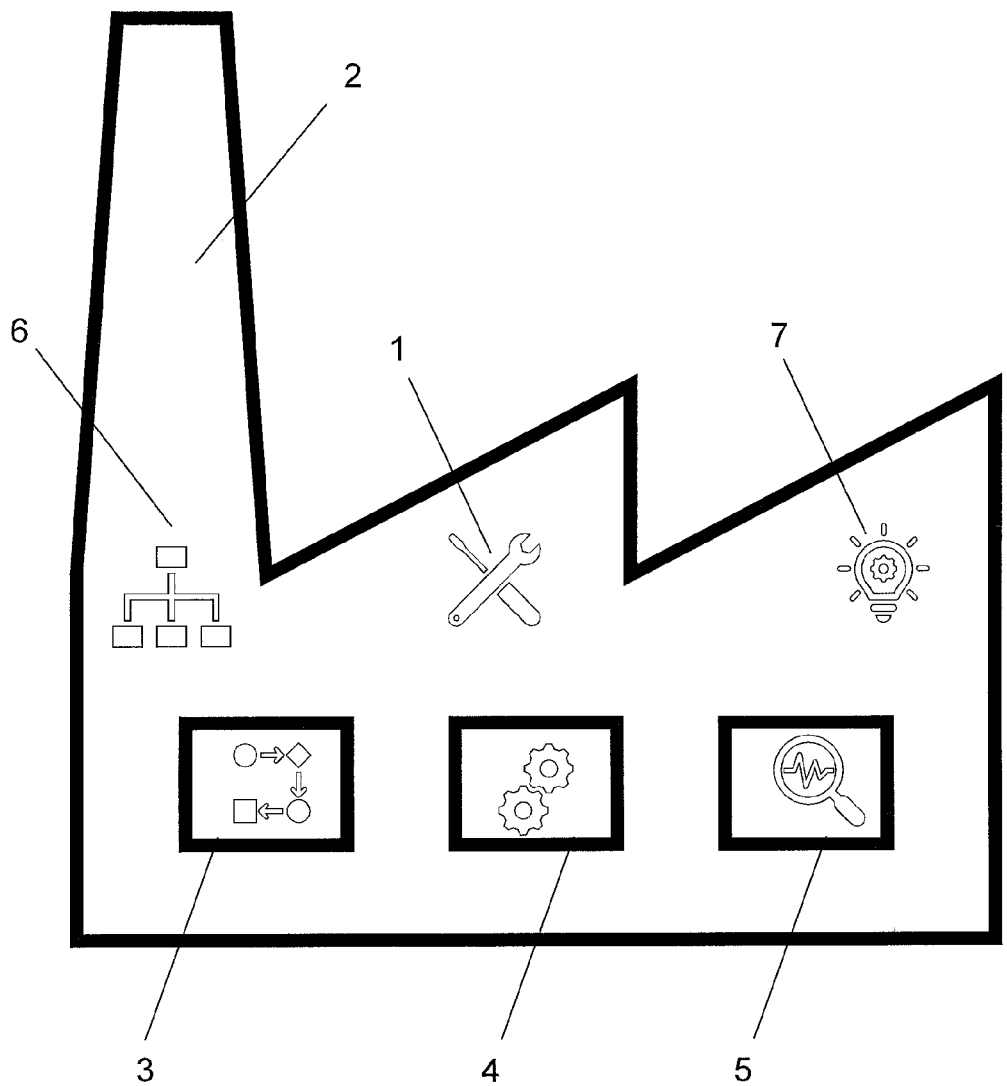
FIG. 1 shows a schematic view of an exemplary embodiment of a maintenance planning system for a production plant.

FIG. 1 shows a schematic view of a production plant 2, in particular a production plant 2 of the metal production industry, the non-ferrous or steel industry or master alloy manufacture. The production plant 2 comprises a maintenance planning system 1 for determining maintenance measures for the production plant 2. The maintenance measures determined by the maintenance planning system 1 comprise, for example, a listing of the maintenance measures to be carried out, a listing of the items required for the maintenance measures to be carried out, a listing of the persons and/or equipment involved in the maintenance measures, a schedule for the maintenance measures to be carried out, a listing and/or execution of orders for operating resources and spare parts, and the like.

The production plant 2 of FIG. 1 comprises a production planning system 3 for determining a production sequence for the production plant 2. The production planning system 3 thereby determines control data for an automation system 4, wherein the automation system 4 controls production in the production plant 2. For this purpose, the automation system 4 executes, for example, the production sequence determined by the production planning system 3, in particular by executing the control data created by the production planning system 3.

The production sequence determined by the production planning system 3 comprises information about which input products are fed to the production plant 2 and which output products are produced from the input products, in particular in which chronological order.

The production plant 2 further comprises a state monitoring system 5 and a business planning system 6.

By means of the state monitoring system 5, states of the production plant 2 and its components are acquired. The state monitoring system 5 can provide a prediction of states of the production plant 2 and its components, which is taken into account by the maintenance planning system 1 when determining maintenance measures.

The business planning system 6 is used for the economic management of production and maintenance in the production plant 2. The business planning system 6 comprises, for example, specifications for the products to be produced. In particular, the business planning system 6 provides economic information on: Material purchasing, resource purchasing, spare parts procurement, spare parts management, delivery costs, delivery times, storage costs, personnel costs, or the like.

The production planning system 3, the automation system 4, the state monitoring system 5, the business planning system 6, and/or the quality determination system 7 identify, monitor, determine or the like one or more of the following parameters: Temperatures, flow rates, spool positions, current consumption, product data, such as material, product identification numbers, torques, vibrations, contamination, wear condition, frequency of use, or the like.

The maintenance planning system 1 takes into account the information from the production planning system 3, the automation system 4, the state monitoring system 5, and the business planning system 6 when determining the maintenance measures. The maintenance planning system optimizes the maintenance measures in the production plant 2 with regard to an economic utilization of the production plant 2.

The maintenance planning system 1 takes into the account the costs for a maintenance measure and the yields achieved by the maintenance measure when optimizing the economic utilization of the production plant 2. In particular, the maintenance planning system 1 takes into account the intensity of the maintenance work, the influence of the maintenance work on product quality and/or process control, the personnel expenditure, or the like, when optimizing the economic utilization of the production plant 2.

Advantageously, the maintenance planning system 1 continuously optimizes the maintenance measures over the runtime of the production plant 2.

The production plant 2 of FIG. 1 further comprises a quality determination system 7 for acquiring product qualities of the products produced in the production plant 2. Preferably, the maintenance planning system 1 takes into account the information of the quality determination system 7 when determining the maintenance measures.

The quality determination system 7 can provide a prediction of product qualities of the products produced in the production plant 2, which can also be taken into account by the maintenance planning system 1 when determining the maintenance measures.

The maintenance planning system 1 can create a digital model 8 of the production plant 2 and, by means of the digital model 8, optimize the maintenance measures with regard to an economic utilization of the production plant 2. The creation of the digital model 8 and the optimization of the economic utilization of the production plant 2 is carried out, in particular, taking into account the information from the production planning system 3, the automation system 4, the state monitoring system 5 and the business planning system 6.

The maintenance planning system 1 preferably continuously trains the digital model 8 created, in particular taking into account information from the production planning system 3, the automation system 4, the state monitoring system 5 and the business planning system 6. The digital model 8 can be based on artificial intelligence methods, in particular machine learning or neural networks, decision trees, linear or nonlinear regression models, support vector machines and/or big data analysis.

For example, the maintenance planning system 1 transmits the maintenance measures determined at least partially to the other systems of the production plant 2, in particular to the production planning system 3, the automation system 4, the state monitoring system 5, the business planning system 6 and/or the quality determination system 7, prior to the carrying out of the maintenance measures.

The maintenance planning system 1 can create an initial maintenance plan with maintenance measures, or an initial maintenance plan with maintenance measures is provided to the maintenance planning system 1. For example, the initial maintenance plan is based on historical data from the production plant 2 and/or data from comparable production plants 2.

Furthermore, the maintenance planning system 1 preferably has a user interface 9 for entering data of a user, in particular of the maintenance personnel, on maintenance work carried out, observed states or defects of the production plant 2, or the like Advantageously, the maintenance planning system 1 identifies main cost drivers of the production plant 2 on the basis of the maintenance measures determined. For the main cost drivers identified, the maintenance planning system 1 can create a special repair strategy and/or special monitoring or initiate replacement.

Expediently, the maintenance planning system 1 comprises an optimizer 10, which optimizes the maintenance measures with regard to an economic utilization of the production plant 2, in particular it determines the next maintenance date that is most economically viable. In particular, the optimizer 10 is based on methods of operation research, such as linear programs, convex optimization, or specifically mixed-integer optimization, or reinforcement learning, such as deep neural networks.

Figure 2:
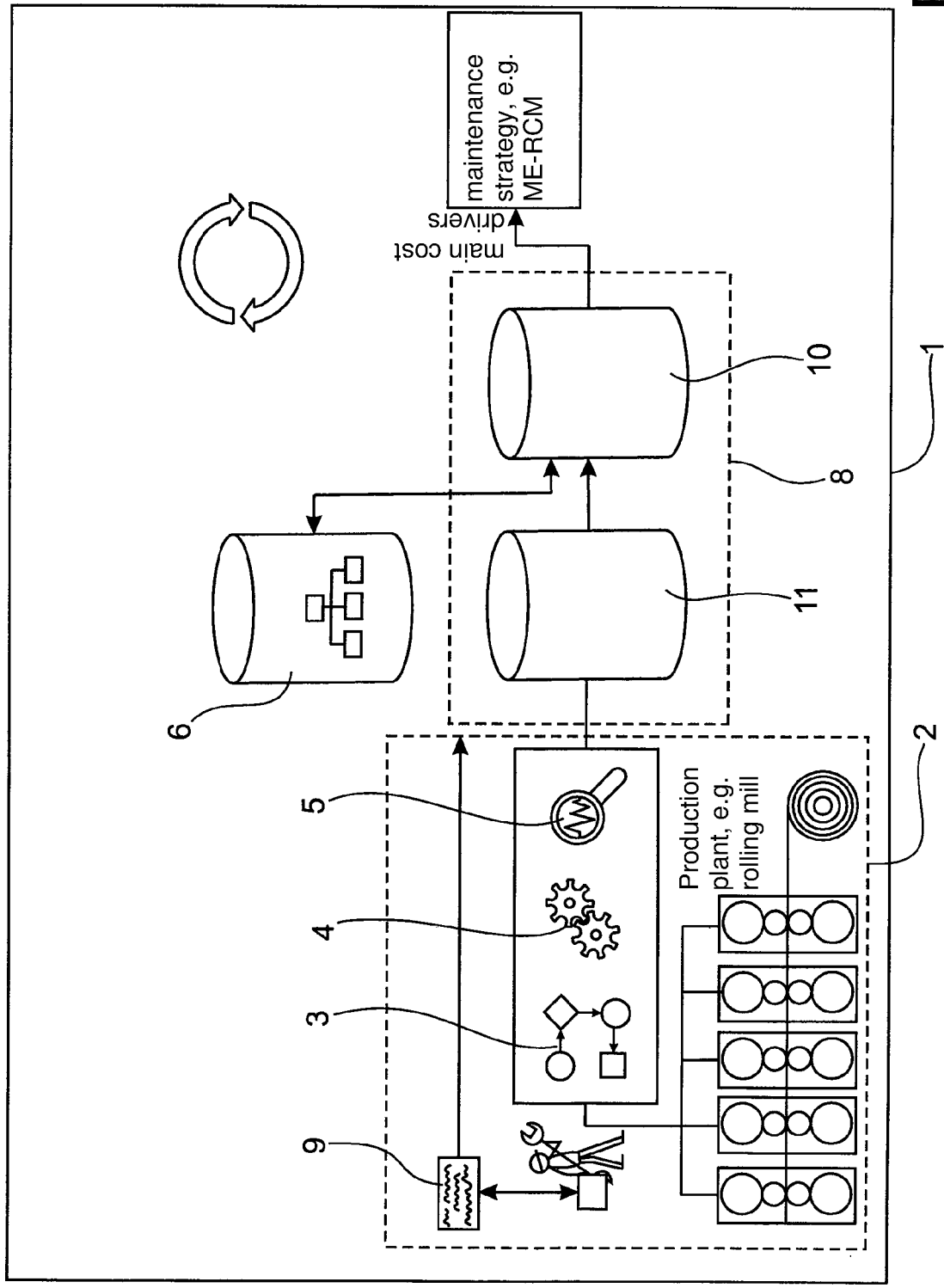
FIG. 2 shows a schematic view of an exemplary embodiment of a method for determining maintenance measures for a production plant.

FIG. 2 shows a schematic view of an exemplary embodiment of a method for determining maintenance measures for a production plant 2.

The method is executed, for example, by a maintenance planning system 1, in particular a maintenance planning system 1 in accordance with the disclosure. The maintenance planning system 1 can be designed integrally with the production plant 2 or as a separate component, which can also be arranged outside the production plant 2.

The method is used to determine maintenance planning measures for a production plant 2, in particular a production plant 2 of the metal production industry, the non-ferrous or steel industry or master alloy manufacture.

In a first step, a product sequence for the production plant 2 is determined. This takes place, for example, through a production planning system 3 of the production plant 2. For example, the production sequence comprises control data for an automation system 4 of the production plant 2.

The production sequence determined comprises in particular information about which input products are fed to the production plant 2 and which output products are produced from the input products, in particular in which chronological order.

The production in the production plant 2 is controlled by executing the production sequence determined. This takes place in particular by executing the control data by the automation system 4.

During production, states of the production plant 2 and its components are acquired. This takes place, for example, through a state monitoring system 5 of the production plant 2. When executing the method, in particular, one or more of the following parameters are identified, monitored, determined or the like: Temperatures, flow rates, spool positions, current consumption, product data, such as material, product identification numbers, torques, vibrations, contamination, wear condition, frequency of use, or the like.

The automation system 4 and the state monitoring system 5 are integral components of the production plant 2. In accordance with the exemplary embodiment of FIG. 2, the production planning system 3 is also a component of the production plant 2, but can theoretically also be arranged outside the production plant 2.

To determine the maintenance measures for production plant 2, additional economic information on the production and maintenance of the production plant 2 is acquired. The economic information is stored, for example, in a business planning system 6, which is designed for the economic management of production and maintenance in the production plant 2. The business planning system 6 can be integral with the production plant 2 or can be an external component, as in the exemplary embodiment in accordance with FIG. 2.

On the basis of the production sequence determined, the control of production, the acquired states and the economic information, the maintenance measures are determined and optimized with regard to an economic utilization of the production plant 2. The maintenance measures determined for the production plant 2 comprise, in particular, a listing of the maintenance measures to be carried out, a listing of the items required for the maintenance measures to be carried out, a listing of the persons and/or equipment involved in the maintenance measures, a schedule for the maintenance measures to be carried out, a listing and/or execution of orders for operating resources and spare parts, and the like.

For example, the economic information acquired comprises one or more of the following: Material purchasing, resource purchasing, spare parts procurement, spare parts management, delivery costs, delivery times, storage costs, personnel costs, or the like.

When optimizing the economic utilization of the production plant 2, for example, the costs for a maintenance measure and the yields achieved by the maintenance measure are taken into account. Furthermore, the optimization of the economic utilization of the production plant 2 may take into account the intensity of the maintenance work, the influence of the maintenance work on product quality and/or process control, the personnel expenditure, or the like.

The maintenance measures determined are at least partially transmitted to the production plant 2, in particular to the production planning system 3, the automation system 4, the state monitoring system 5, the business planning system 6 and/or a quality determination system 7 of the production plant 2, prior to the carrying out of the maintenance measures.

The method can also comprise the step of identifying a prediction of states of the production plant 2 and its components. The prediction of the states of the production plant 2 and its components is preferably taken into account when determining the maintenance measures.

Advantageously, the method comprises the step of identifying a prediction of product qualities of the products produced in the production plant 2, which is preferably taken into account when determining the maintenance measures. This takes place, for example, by means of a quality determination system 7. The quality determination can be carried out within the production plant 2 or is downstream of it.

Furthermore, the method can comprise the step of identifying a prediction of product qualities of the products produced in the production plant 2, wherein the prediction identified is preferably taken into account when determining the maintenance measures.

Preferably, the maintenance measures are continuously optimized over the runtime of the production plant 2.

The exemplary embodiment in accordance with FIG. 2 comprises the step of creating a digital model 8 of the production plant 2. By means of the digital model 8, the maintenance measures are optimized with regard to an economic utilization of the production plant 2, in particular taking into account the production sequence determined, the control of production, the states acquired and the economic information acquired.

Preferably, the digital model 8 is trained continuously. The training is carried out taking into account the production sequence determined, the control of production, the states acquired and the economic information acquired.

For example, the digital model 8 is based on artificial intelligence methods, in particular machine learning or neural networks, decision trees, linear or nonlinear regression models, support vector machines and/or big data analysis.

The digital model in accordance with FIG. 2 comprises a data storage unit 11 for the production sequence determined, the control of production and the states acquired. The economic information is provided to the digital model 8 directly from the business planning system 6.

To determine the maintenance measures, the digital model 8 comprises an optimizer 10, which optimizes the maintenance measures with regard to an economic utilization of the production plant 2, in particular it determines the next maintenance date that is most economically viable. In particular, the optimizer 10 is based on methods of operation research, such as linear programs, convex optimization, or specifically mixed-integer optimization, or reinforcement learning, such as deep neural networks.

For initialization, an initial maintenance plan of maintenance measures can be created or provided to the method, wherein the initial maintenance plan is based on historical data from the production plant 2 and/or data from comparable production plants 2.

The method preferably comprises the step of a manual data input by a user 12, in particular by the maintenance personnel, regarding maintenance work carried out, observed states or defects of the production plant 2, or the like. For example, data entry takes place via a user interface 9. The user interface 9 can be provided on a computer, tablet, smartphone or the like.

By means of the method, the main cost drivers of the production plant 2 can be identified on the basis of the maintenance measures determined. Special repair measures or special monitoring may be created for the major cost drivers identified. Alternatively, the main cost drivers may be replaced with other components if necessary.

LIST OF REFERENCE SIGNS

1 Maintenance planning system
2 Production plant
3 Production planning system
4 Automation system
5 State monitoring system
6 Business planning system
7 Quality determination system
8 Digital model
9 User interface
10 Optimizer
11 Data storage unit
12 User

The invention claimed is:

1. A production plant (2) of the metal production industry, the non-ferrous or steel industry or master alloy manufacture, comprising:
a production planning system (3) for determining a production sequence for the production plant (2) including control data for an automation system (4);
the automation system (4) for controlling production in the production plant (2), wherein the automation system (4) executes the production sequence determined by the production planning system (3);
a state monitoring system (5) for acquiring states of the production plant (2) and its components,
wherein the state monitoring system (5) provides a prediction of states of the production plant and its components;
a business planning system (6) for economic management of production and maintenance in the production plant (2),
wherein the business planning system provides economic information relating to one or more of material purchasing, resource purchasing, spare parts procurement, spare parts management, delivery costs, delivery times, storage costs, and personnel costs; and
a maintenance planning system (1), wherein the maintenance planning system (1) is designed to determine maintenance measures for the production plant (2), including
a listing of the maintenance measures to be carried out,
a listing of items required for the maintenance measures to be carried out,
a listing of persons and/or equipment involved in the maintenance measures,
a schedule for the maintenance measures to be carried out, and
a listing and/or execution of orders for operating resources and spare parts,
wherein the maintenance planning system (1) creates a digital model (8) of the production plant (2),
wherein the digital model (8) is a digital twin of the production plant (2) and comprises information of the production planning system (3), the automation system (4), the state monitoring system (5), and the business planning system (6),
wherein the maintenance planning system (1) by the digital model (8) optimizes the maintenance measures with regard to an economic utilization of the production plant (2) in order to dynamically adapt an overall economic balance of the production plant (2) with respect to maintenance to a current load situation and a near future load situation,
wherein the digital model (8) associates the following information to determine the maintenance measures:
the determined production sequence of the production plant (2) of the production planning system (3),
the control data of the automation system (4),
the acquired states of the production plant (2) and its components, and
the prediction of states of the production plant (2) and its components of the state monitoring system (5) and
the economic information of the business planning system (6).

2. The production plant (2) according to claim 1, further comprising
a quality determination system (7) for acquiring product qualities of products produced in the production plant (2),
wherein the maintenance planning system (1) takes into account information of the quality determination system (7) when determining the maintenance measures.

3. The production plant (2) according to claim 1,
wherein the maintenance planning system (1) takes into account a costs of a maintenance measure and a yield achieved by the maintenance measure when optimizing the economic utilization of the production plant (2).

4. The production plant (2) according to claim 1,
wherein the maintenance planning system (1), when optimizing the economic utilization of the production plant (2), takes into account one or more of
an intensity of the maintenance measures, an influence of the maintenance measures on product quality and/or process control, and a personnel expenditure.

5. The production plant (2) according to claim 2,
wherein the maintenance planning system (1) transmits the determined maintenance measures at least partially to other systems of the production plant (2), including to the production planning system (3), the automation system (4), the state monitoring system (5), the business planning system (6) and/or the quality determination system (7), prior to carrying out the maintenance measures.

6. The production plant (2) according to claim 1,
wherein the maintenance planning system (1) has a user interface (9) for entering data of a user (12), including maintenance personnel, on one or more of maintenance work carried out, observed states, and defects of the production plant (2).

7. The production plant (2) according to claim 1,
wherein the maintenance planning system (1) identifies main cost drivers of the production plant (2) based on the determined maintenance measures.

8. The production plant (2) according to claim 1,
wherein the maintenance planning system (1) comprises an optimizer (10) which optimizes the maintenance measures with regard to an economic utilization of the production plant (2) and determines a next maintenance date that is most economically viable.

9. A method for determining maintenance measures for a production plant (2) of the metal production industry, the non-ferrous or steel industry or master alloy manufacture, comprising:
determining a production sequence for the production plant (2) and control data for an automation system (4) by a production planning system (3) of the production plant (2);
controlling production in the production plant (2) by executing the determined production sequence by an automation system (4);
acquiring states of the production plant (2) and its components by a state monitoring system (5) of the production plant (2);
predicting states of the production plant (2) and its components by the state monitoring system (5) of the production plant (2);
acquiring economic information on production and maintenance in the production plant (2) by a business planning system (6) of the production plant (2),
wherein the acquired economic information relates to one or more of material purchasing, resource purchasing, spare parts procurement, spare parts management, delivery costs, delivery times, storage costs, and personnel costs; and
determining maintenance measures for the production plant (2) by a maintenance planning system (1), comprising
a listing of the maintenance measures to be carried out,
a listing of items required for the maintenance measures to be carried out,
a listing of persons and/or equipment involved in the maintenance measures,
a schedule for the maintenance measures to be carried out, and
a listing and/or execution of orders for operating resources and spare parts;
creating a digital model (8) of the production plant (2) by the maintenance planning system (1),
wherein the digital model (8) is a digital twin of the production plant (2) and comprises information of the production planning system (3), the automation system (4), the state monitoring system (5), and the business planning system (6);
optimizing, by the digital model (8), the maintenance measures with regard to an economic utilization of the production plant (2) in order to dynamically adapt an overall economic balance of the production plant (2) with respect to maintenance to a current load situation and a near future load situation; and
associating the determined production sequence, the control of production, the acquired states, the predicted states, and the acquired economic information when determining the maintenance measures.

10. The method according to claim 9, further comprising:
identifying product qualities of products produced in the production plant (2), which are taken into account when determining the maintenance measures.

11. The method according to claim 9,
wherein the maintenance measures are continuously optimized over a runtime of the production plant (2).

12. The method according to claim 9,
wherein an initial maintenance plan with maintenance measures is created or provided,
wherein the initial maintenance plan is based on historical data from the production plant (2) and/or on data from comparable production plants (2).

13. The method according to claim 9,
comprising manual data input by a user (12), including maintenance personnel, regarding one or more of maintenance work carried out, observed states, and defects of the production plant (2).

14. The method according to claim 9, further comprising:
identifying main cost drivers of the production plant (2) based on the maintenance measures determined.

* * * * *